United States Patent [19]

Javitt

[11] Patent Number: 5,787,162
[45] Date of Patent: Jul. 28, 1998

[54] APPARATUS AND METHOD FOR SCHEDULING URGENT COMMUNICATION SESSIONS

[75] Inventor: Joel I. Javitt, Hillside, N.J.

[73] Assignee: AT&T Corp., Middletown, N.J.

[21] Appl. No.: 529,704

[22] Filed: Sep. 18, 1995

[51] Int. Cl.⁶ .................................................. H04M 3/42
[52] U.S. Cl. .......................... 379/229; 379/201; 379/202; 379/387; 370/259; 370/260; 370/270
[58] Field of Search ................................... 379/201, 202, 379/211, 212, 58, 61, 207, 265, 266, 57, 210, 243, 229, 230, 231, 387; 370/260, 270, 259

[56] References Cited

U.S. PATENT DOCUMENTS

| | | | |
|---|---|---|---|
| 4,313,035 | 1/1982 | Jordan et al. | 379/207 |
| 4,796,293 | 1/1989 | Blinken et al. | 379/202 |
| 4,893,335 | 1/1990 | Fuller et al. | 379/200 |
| 4,910,766 | 3/1990 | Ogino et al. | 379/243 |
| 5,153,905 | 10/1992 | Bergeron et al. | 379/209 |
| 5,243,645 | 9/1993 | Bissell et al. | 379/211 |
| 5,278,898 | 1/1994 | Cambray et al. | 379/266 |
| 5,311,583 | 5/1994 | Friedes et al. | 379/209 |
| 5,327,486 | 7/1994 | Wolff et al. | 379/211 |
| 5,329,578 | 7/1994 | Brennan et al. | 379/67 |
| 5,349,649 | 9/1994 | Iijima | 395/275 |
| 5,384,831 | 1/1995 | Creswell et al. | 379/211 |
| 5,386,512 | 1/1995 | Crisman et al. | 395/200 |
| 5,434,908 | 7/1995 | Klein | 379/88 |
| 5,434,984 | 7/1995 | Deloddere et al. | 395/288 |
| 5,500,889 | 3/1996 | Baker et al. | 379/243 |
| 5,546,449 | 8/1996 | Hogan et al. | 379/202 |
| 5,548,636 | 8/1996 | Bannister et al. | 379/210 |
| 5,610,970 | 3/1997 | Fuller et al. | 379/210 |
| 5,625,680 | 4/1997 | Foladare et al. | 379/243 |

FOREIGN PATENT DOCUMENTS

WO 91/07838  4/1991  WIPO ................ H04M 11/00

*Primary Examiner*—Krista Zele
*Assistant Examiner*—Scott Wolinsky
*Attorney, Agent, or Firm*—Alfred G. Steinmetz

[57] ABSTRACT

Communication systems, terminals and methods are provided which are capable of supporting, and/or being used in conjunction with, communication session scheduling. The communication systems include a plurality of terminals, ones of which are operative to receive and transmit communication signals among a plurality of parties. At least one terminal includes both an interface operative to receive a scheduling signal and a circuit. The circuit is operative in response to the received scheduling signal to modify selectively one of either a first data set or a second data set. The first data set represents the availability of a first party to respond to a received communication signal. The second data set represents the priority associated with a particular communication signal transmitted from the first party to at least a second party.

30 Claims, 6 Drawing Sheets

APPARATUS AND METHOD FOR SCHEDULING URGENT COMMUNICATION SESSIONS

TECHNICAL FIELD OF THE INVENTION

The present invention relates generally to the field of telephony, and more particularly, to terminals, methods and systems which provide session scheduling for intelligent communication.

BACKGROUND OF THE INVENTION

Telecommunications involves the transmission of speech and data between two or more points using electric signals. Representative communication media include air, wire, fiber optic cable, and the like.

Through conventional communication systems and emerging technologies, including without limitation wired, wireless and video telephony, pagers, e-mail and voice mail systems, and the like, individual "reachability" has significantly increased. In so doing, modern telecommunications has failed to provide for convenient direct person to person communication.

Business people, for example, are often required to leave multiple telephone numbers where, and/or beeper numbers through which, they may be reached. Callers are required to understand the different communication technologies available to reach a particular party and to determine the optimum approach, considering cost, quality, availability, etc., to reach that party at a given time.

Conventional approaches have also failed to address problems associated with information overload and time management. Called parties are often interrupted by an incoming call causing a loss of productivity while performing some activity. Worse, the party called often decides that the interrupting call is less important than the present activity and a response to the same may wait until a more appropriate time.

Alternatively, two individuals may wish to have a conversation but neither is available at the same time. Both parties waste time and effort receiving messages to call the other back, only to find that the other party is not available. This phenomenon is commonly referred to as "telephone tag". This problem is compounded further when three or more parties wish to have a conference call.

The effects of the foregoing deficiencies remain a dominant obstacle to producing more efficient, intelligent and commercially desirable telephony based systems and products.

SUMMARY OF THE INVENTION

Broadly, the present invention is directed to terminals, methods and systems which provide session scheduling for intelligent communication. The invention provides communication management functionality that requires only a minimum of user control. Conversations between parties are enabled automatically and in an optimum manner avoiding unnecessary and annoying interruptions. A calling party simply specifies the party or parties with whom he wishes to speak and the urgency of the call. The parties are automatically connected as soon as they are available for a call of the stated priority.

The principles of the present invention are particularly beneficial when utilized to provide a data link for communication with wired, wireless (e.g., vehicular and hand held cellular telephones) and video telephony, hand-held/ personal/notebook/laptop computers ("PCs"), personal communication assistants ("PCAs"), suitably arranged paytelephones, message paging, e-mail, voice mail and the like.

An exemplary terminal in accordance with the principles of the present invention may suitably be used with a communication system capable of supporting communication session scheduling. The terminal includes receiving and transmitting means, an interface and a circuit.

The receiving and transmitting means are operative to receive and transmit communication signals between a first party and at least a second party via the communication system. The interface is operative to receive a scheduling signal. The circuit is operative in response to the received scheduling signal to modify selectively at least one of either a first data set or a second data set. The first data set represents the availability of the first party to respond to a particular received communication signal. The second data set represents the urgency associated with a particular communication signal transmitted from the first party to at least the second party.

An important aspect of the invention is that the scheduling signal may suitably be received from either the first party or a scheduling apparatus.

A system in accordance with the principles of the present invention operates to provide selectively one or more data links between ones of a plurality of terminals. Each one of the terminals is operative to transmit and receive one or more signals via the one or more selectively provided data links. An exemplary system includes an input port, a memory and circuitry.

The input port is operative to receive a first signal transmitted from a first terminal to a second terminal. A portion of the first signal represents the urgency associated with the first signal. The memory is operative to store a data set representing the availability of the second terminal to respond to the first signal. The circuitry is operative to compare the data set and the portion of the first signal. In response to the comparison, the circuitry may provide a data link between the first terminal and the second terminal. Otherwise, the circuitry will transmit, as a function of the data set and the portion of the first signal, a second signal from the second terminal to at least the first terminal. At least a portion of the second signal represents the urgency associated with the second signal.

Another important aspect is that any system, terminal and, in particular, any circuitry, in accordance with the principles of the present invention may suitably be firmware, hardware or processing system based.

A method in accordance with the principles of the present invention concerns selectively scheduling communication sessions between ones of a plurality of terminals in a communication system. Each one of the terminals is operative to transmit and receive one or more signals via the communication system. A first signal is transmitted from a first terminal to a second terminal. A portion of the first signal represents the urgency of a communication session between the first terminal and the second terminal. The availability of the second terminal to respond to the first signal is determined using at least the portion of the first signal. The communication session is established upon a determination that the second terminal is available, otherwise establishment of the communication session is deferred until the second terminal is available, preferably as a function of the portion of the first signal.

One embodiment for using and/or distributing the present invention is as software. The software embodiment includes a plurality of processing instructions which are stored to a conventional storage medium. The instructions are readable and executable by one or more processing systems having one or more processing units. The instructions, upon execution, control the one or more processing units to provide communication session scheduling in a communication system. Preferred storage media include without limitation magnetic, optical, and semiconductor, as well as suitably arranged combinations thereof.

The foregoing has outlined, rather broadly, preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, reference is now made to the following descriptions taken in conjunction with the accompanying drawings in which like designations represent like parts, and in which.

DETAILED DESCRIPTION

Figure 1A:
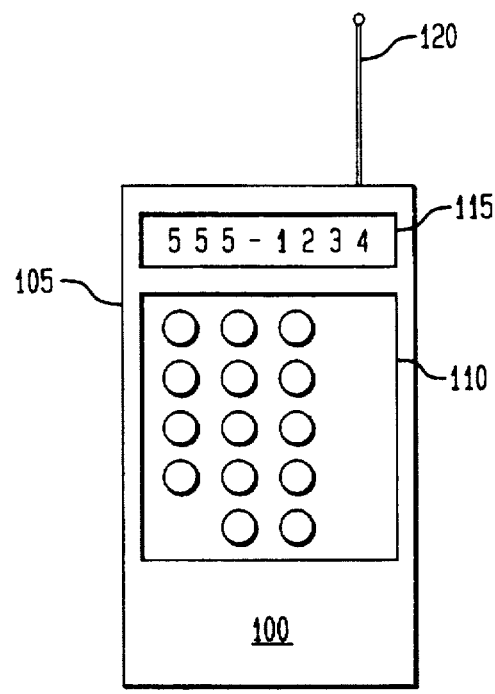
FIG. 1A illustrates an exemplary wireless terminal in accordance with the principles of the present invention.
Figure 1B:
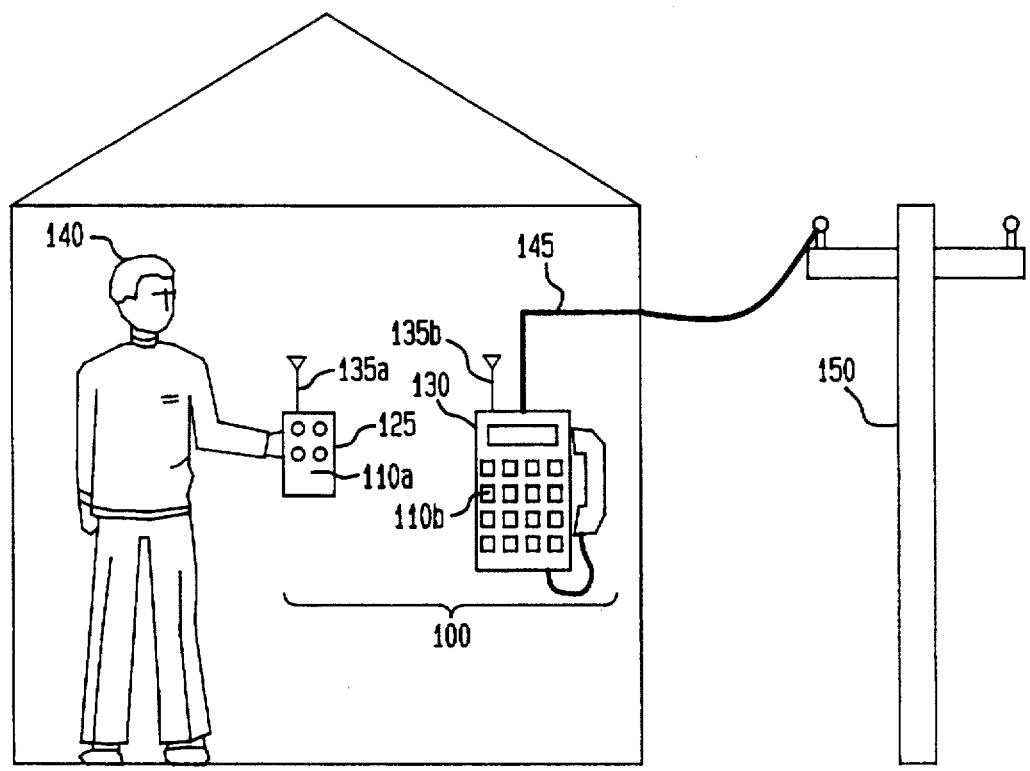
FIG. 1B illustrates an exemplary terminal having at least two apparatus in accordance with the principles of the present invention.

FIGS. 1A and 1B illustrate exemplary terminals that may suitably be arranged to operate in accordance with the principles of the present invention. Each of the terminals is operative in conjunction with a suitably arranged communication system that is capable of supporting communication session scheduling. "Communication session scheduling" as used herein includes without limitation establishing a data link or connection at an optimum time between two or more terminals enabling communication therebetween. "Data link" as used herein includes without limitation any suitable hardware, firmware and software configuration that enables a plurality of terminals to communicate, i.e., to transmit and receive one or more signals or data packets, such as over a communication channel. "Terminal" as used herein includes without limitation any station, device, apparatus and/or the like which is used to transmit and receive one or more signals. "Signal" as used herein includes without limitation data packets, sequence of data, or any other variation of a physical quantity used to convey information. Exemplary communication systems will be discussed in greater detail with reference to FIGS. 3 to 6.

FIG. 1A illustrates an exemplary terminal 100, a wireless telephone, having a housing 105, a keypad 110, a display 115 and at least one suitably arranged antenna 120. Keypad 110 preferably includes a set of keys or control levers having a systematic arrangement that is used to operate wireless telephone 100. Display 115 provides a visible representation of information, such as a telephone number for example, presented in graphical or character form. Wireless antenna 120 is operative to receive and transmit communication signals between a first party using wireless telephone 100 and at least a second party via a suitable communication system.

Keypad 110 is also operative to provide an interface through which one or more scheduling signals may be received from a user of wireless telephone 100. "Scheduling signals" as used herein includes without limitation electromagnetic signals used to select an urgency level for a particular call a user is making and/or a priority level based on the importance of the user's current activity as compared with the urgency of any incoming call.

One example of a suitable priority and/or urgency coding scheme would use "1" for extreme emergency to "9" for a low level activity, with values therebetween representing various levels of activity. The development of an appropriate implementation/scheme of scheduling signals is applications specific. As will be discussed with reference to FIGS. 3 to 6, the user will only be alerted as to the reception of an incoming communication if the urgency of the communication is equal to or exceeds the user's current priority level.

In alternate embodiments, scheduling signals may suitably be received from any other suitably arranged input device or alternatively a scheduling apparatus, such as a PC, PDA or the like, running a time management program. Such scheduling signals may suitably be received over a wired or wireless data link through a parallel or serial port (not shown) of wireless telephone 100.

FIG. 1B illustrates another exemplary terminal 100 in accordance with the principles of the present invention. Exemplary terminal 100 includes at least two exemplary apparatus, or devices, wherein a first apparatus is a portable communication device 125 and a second is a wired telephone 130. Each exemplary apparatus 125, 130 includes an antenna 135a, 135b and a keypad 110a, 110b, respectively. Each antenna 135a, 135b is suitably arranged to provide a data link for wireless communication between first and second apparatus 125, 130, respectively. Each keypad 110a, 110b preferably includes a set of keys or control levers, again having a systematic arrangement, used to operate portable communication device 125 and wired telephone 130, respectively.

Wired telephone 130 is operative to receive and transmit communication signals between a user 140 and at least another party. The foregoing is accomplished using a suitable communication system 145, 150 to which wired telephone 130 is coupled.

In the illustrated embodiment, keypad 110a is further operative to provide an interface through which one or more scheduling signals may suitably be received. Again, in alternate embodiments, scheduling signals may be received from another suitably arranged input device or alternatively a suitable scheduling apparatus running a time management program.

An aspect of any multiple apparatus terminal in accordance with the present invention is that first apparatus 125 may suitably be implemented in a compact and light embodiment capable of being continuously worn by a user. Further, second apparatus 130 may in point of fact be wired, as shown, or wireless.

Other preferred embodiments, whether embodied in a single or multiple apparatus terminal, include without limitation vehicular wireless telephones, suitably arranged PCs and PDAs, specially equipped pay telephones, and the like. Another important aspect is that the receiving and transmitting means may suitably be configured to receive and/or transmit either voice and/or data communication signals. Further, terminal 100 may suitably include means for indicating that a communication signal has been received, including without limitation audio, visual, physical sensation or the like.

It should be noted that the interface provided by keypad 110 and 110a of FIGS. 1A and 1B, respectively, are illustrative only and that the associated functionality may suitably be provided by any means operative to receive a scheduling input and in response thereto to generate a scheduling signal, including without limitation speech or hand writing recognition.

In addition to the services which will be described with reference to FIGS. 3 to 6, terminal 100 may suitably be arranged to provide other communication related features, including without limitation, world wide direct access codes, password protected credit card numbers, time zone conversion and the like. Terminal 100 may also include a personal directory and function as an auto-dialer through data link or Dual-Tone Multi-Frequency ("DTMF") generation.

Figure 2:
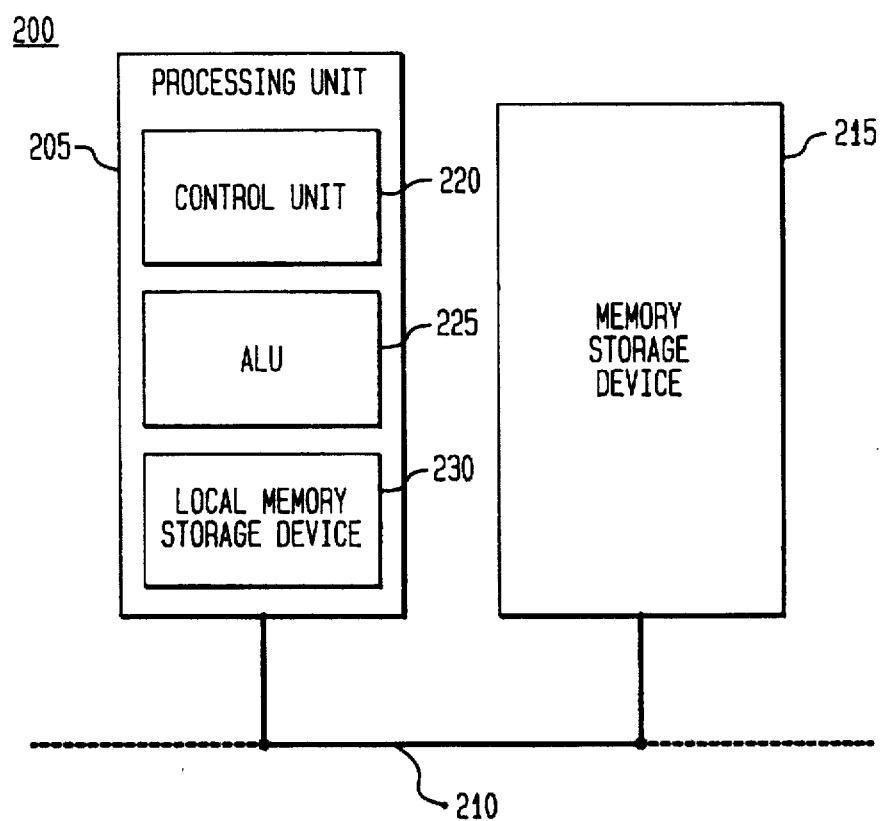
FIG. 2 illustrates a block diagram of one exemplary microprocessing system which may suitably be utilized in conjunction with the exemplary terminals of FIGS. 1A and 1B.

FIG. 2 illustrates a block diagram of one exemplary microprocessing system 200 which may suitably be utilized in conjunction with the exemplary terminals of FIGS. 1A and 1B. Microprocessing system 200 includes a single processing unit 205 coupled via data bus 210 with a single memory storage device 215. Memory storage device 215 is suitably operative to store data and/or one or more processing system instructions which processing unit 205 is operative to retrieve and execute. Memory storage device 215 may be any suitable memory storage device or plurality thereof.

Processing unit 205 includes a control unit 220, an arithmetic logic unit ("ALU") 225 and a local memory storage device 230 (e.g., stackable cache, a plurality of registers, etc.). Control unit 220 is operative to fetch processing system instructions from memory storage device 215. ALU 225 is operative to perform a plurality of operations, including addition and Boolean AND, needed to carry out those instructions. Local memory storage device 230 is operative to provide local high speed storage used for storing temporary results and control information.

In accordance with the illustrated embodiment, microprocessing system 200 is operative to receive, possibly via data bus 210, a scheduling signal. Microprocessing system 200 operates, in response to the received scheduling signal, to modify selectively at least one of a first data set and a second data set. Either or both of the data sets are preferably stored in at least one of either memory storage device 215 or local memory storage device 230. The first data set represents the availability of the first party to respond to a received communication signal, whereas the second data set represents a priority associated with a particular communication signal transmitted from the first party to at least the second party.

In alternate exemplary embodiments, microprocessing system 200 may suitably be replaced by, or combined with, without limitation, programmable logic devices, such as PALs (programmable array logic) and PLAs (programmable logic arrays), DSPs (digital signal processors), FPGAs (field programmable gate arrays), ASICs (application specific integrated circuits), VLSIs (very large scale integrated circuits) and the like. Further, processing unit 205 and memory storage device 215 may be separately implemented in first apparatus 125 and second apparatus 130, respectively.

Figure 3:
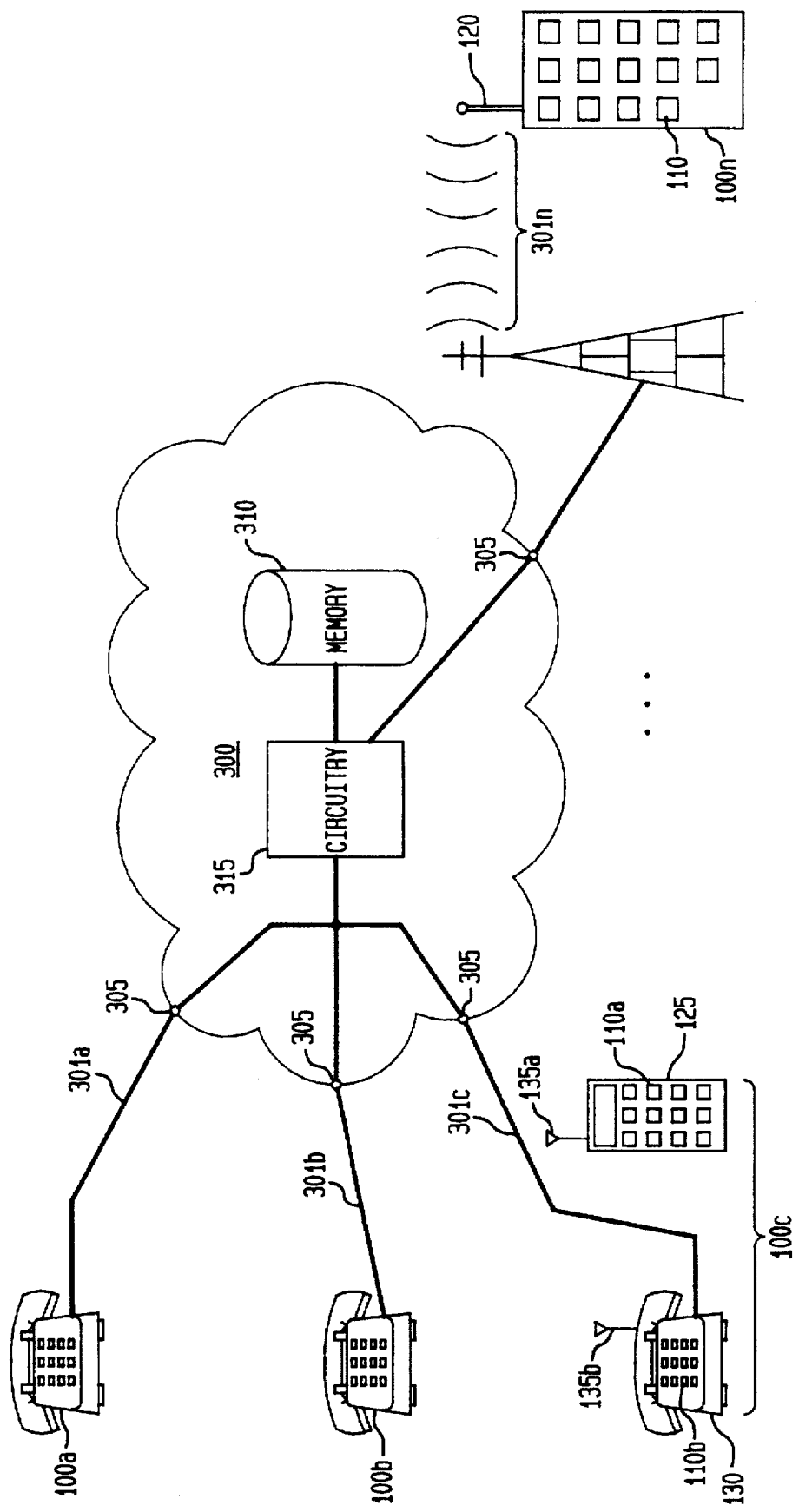
FIG. 3 illustrates a block diagram of an exemplary communication system capable of supporting communication session scheduling in accordance with the principles of the present invention.

FIG. 3 illustrates a block diagram of an exemplary communication system 300 that is capable of supporting communication session scheduling in accordance with the principles of the present invention. System 300 includes a plurality of exemplary terminals 100a to 100n and is operative to provide selectively one or more data links 301a to 301n between particular ones of terminals 100a to 100n. Each one of terminals 100a to 100n is preferably operative to transmit and receive one or more signals via the one or more selectively provided data links 301a to 301n.

System 300 includes without limitation at least one input port 305, at least one memory 310 and circuitry 315. Input port 305 is operative to receive a first signal transmitted from a first terminal, such as terminal 100b, to at least a second terminal, such as terminal 100n, for example. At least a portion of the first signal represents an urgency level associated with the first signal. As discussed with reference to FIGS. 1A and 1B, interface 110 enables a user to select or specify the urgency level when transmitting a communication. The urgency level indicates the speed with which the first signal must be responded to by second terminal 100n.

A memory associated with each terminal, such as memory storage device 215 or memory 310, for example, is operative to store at least one data set, which represents the availability of second terminal 100n to respond to the first signal. Also as discussed with reference to FIGS. 1A and 1B, interface 110 enables user 140 to select or specify a current priority level based on the importance of its current activity as compared to the particular urgency associated with one or more incoming calls.

Circuitry 315 is operative to compare the data set and the portion of the first signal representing the urgency factor. If the comparison indicates that second terminal 100n is able to respond to the first signal, then circuitry 315 is operative to provide a data link between first terminal 100b and second terminal 100n. Second terminal 100n alerts user 140 to reception of the first signal only if the urgency associated therewith equals or exceeds second terminal 100n's current availability or priority level. Establishment of a data link allows terminals 100b and 100n to suitably transmit voice and/or data signals, such as video data, therebetween.

If the comparison indicates that second terminal 100n is unavailable to respond to the first signal, then circuitry 315 is operative to transmit, as a function of the data set and the portion of the first signal, a second signal from second terminal 100n to at least first terminal 100b. At least a portion of the second signal represents the urgency associated with the second signal, i.e., the urgency with which the first signal must be responded to by first terminal 100b. Recall, that the development of a preferable urgency and/or availability coding scheme is application dependent.

Figure 4:
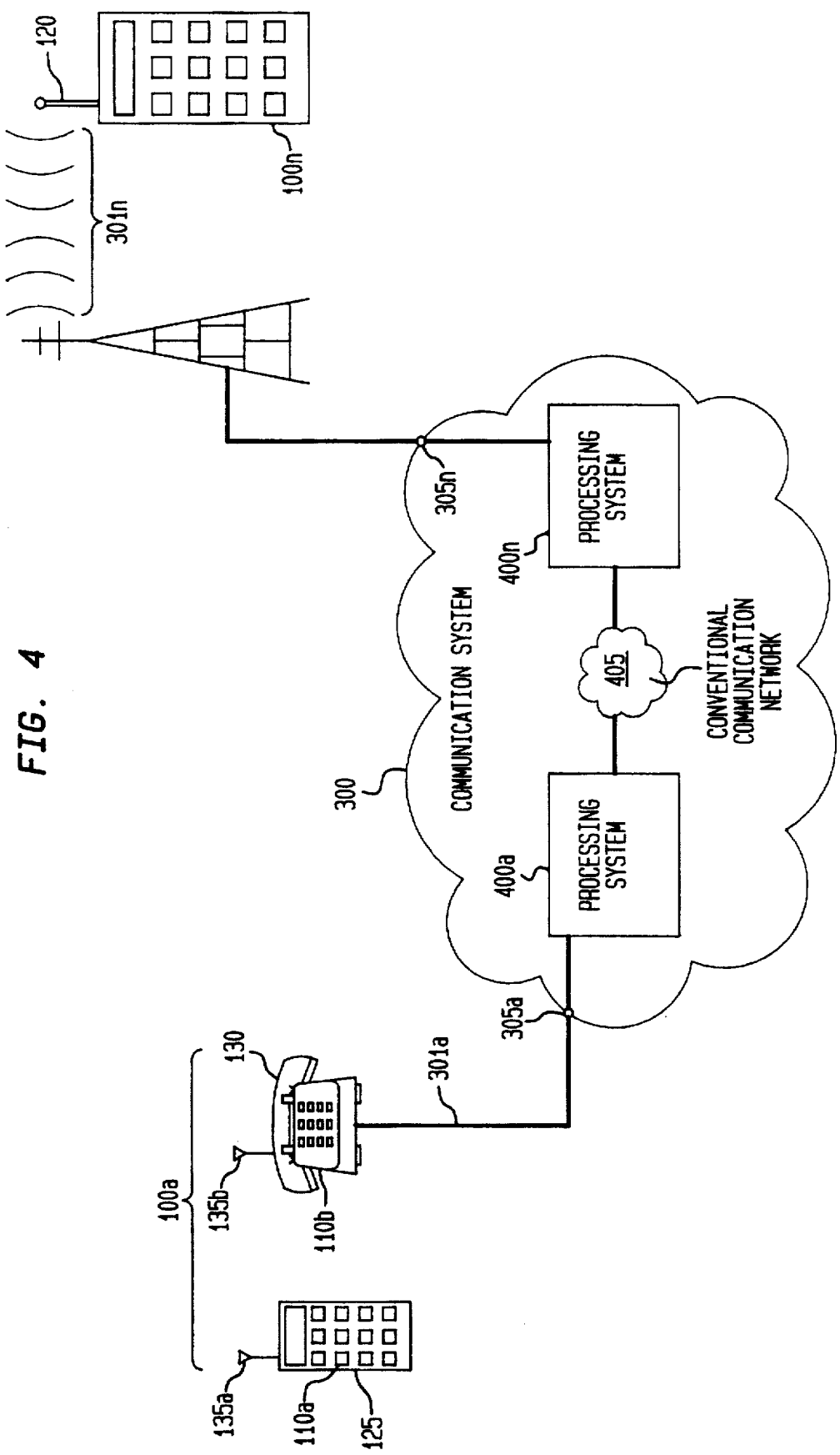
FIG. 4 illustrates a block diagram of another exemplary communication system in accordance with the principles of the present invention.

FIG. 4 illustrates a block diagram of another exemplary communication system 300 in accordance with the principles of the present invention. Communication system 300 includes a plurality of processing systems 400a to 400n which are in operative communication with one another via a conventional communication network 405. Each processing system 400 preferably includes one or more processing units in operative communication with one or more memory storage devices.

It should be noted that any processing system capable of functioning in accordance with communication system 300 and/or communication network 405 may suitably replace, or be utilized in conjunction with, any of processing systems 400, including without limitation, videophones, telephones, televisions, sophisticated calculators and, hand-held, laptop/notebook, personal, mini, mainframe and super computers, including RISC and parallel processing architectures, as well as within processing system network combinations of the foregoing. Conventional processing system architecture is more fully discussed in *Computer Organization and Architecture*, by William Stallings, MacMillan Publishing Co. (3rd ed. 1993), which is incorporated herein by reference. Alternatively, any of processing systems 400 may suitably be combined with or replaced by, without limitation, DSPs, FPGAs, ASICs, VLSIs, and the like, in accordance with the present invention as previously discussed.

It should be noted also that although each terminal 100 is shown suitably coupled with a single processing system 400, in point of fact, each terminal 100 may suitably be coupled with a plurality of processing systems 400. Similarly, each processing system 400 may suitably be coupled with a plurality of terminals 100, such as a Public Switched Telephone Network ("PSTN") switching office for example.

Figure 5:
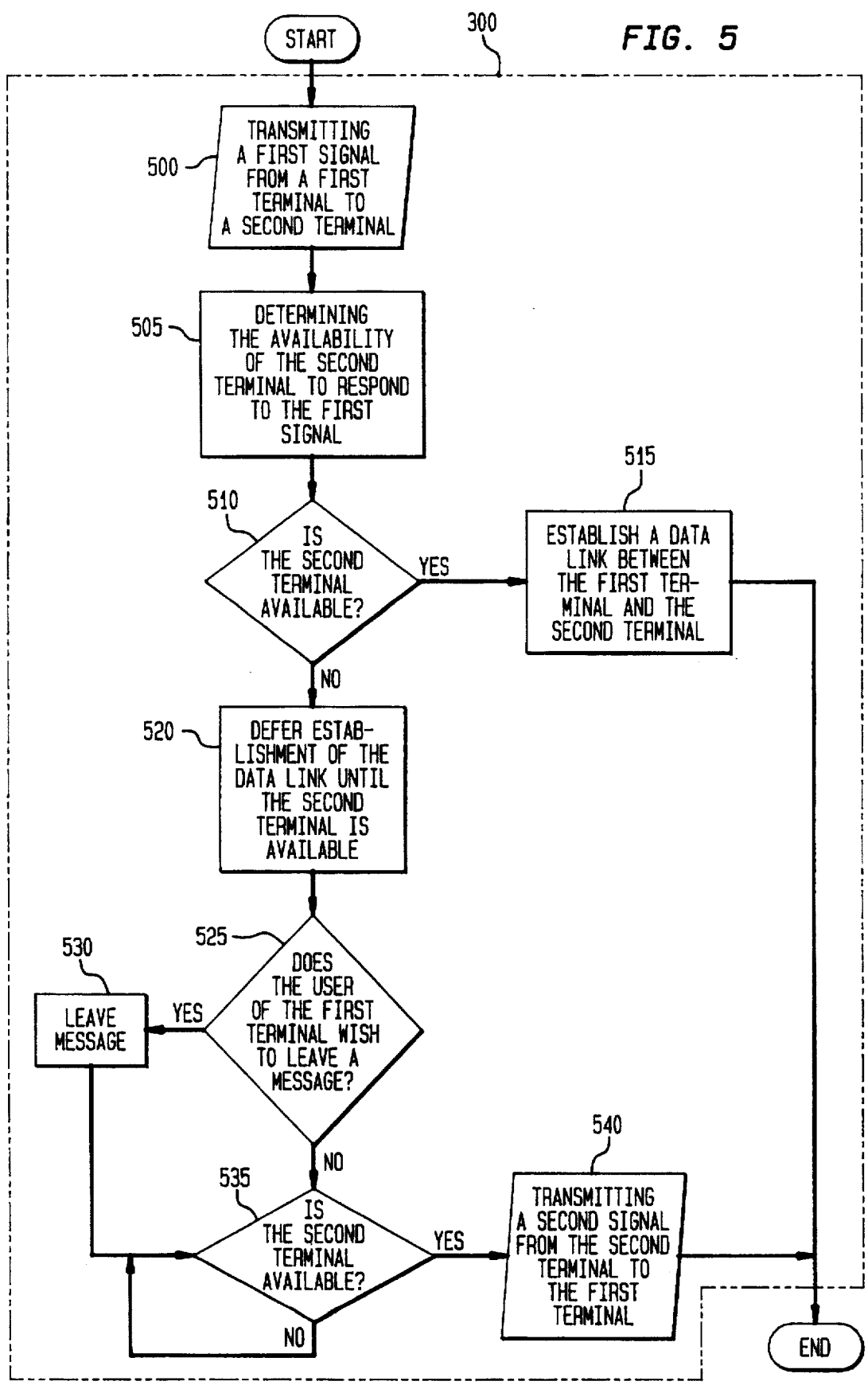
FIG. 5 illustrates a flow diagram for selectively scheduling communication sessions between ones of a plurality of terminals of a communication system in accordance with the principles of the present invention.

FIG. 5 illustrates a flow diagram for selectively scheduling communication sessions between ones of a plurality of terminals 100 of communication system 300 in accordance with the principles of the present invention. Each terminal 100 is preferably operative to transmit and receive one or more signals via communication system 300.

A first signal is initiated and transmitted from a first terminal to at least a second terminal (input/output block 500). At least a portion of the first signal preferably represents an urgency level, i.e., the urgency with which a data link or communication session must be established between the first and second terminals.

In other words, a user initiates a communication session by indicating one or more parties to call and associating an urgency level with the communication session and/or each particular call. In addition, the caller may enter a deadline for the communication session or each call, an estimated length for the communication session, a topic statement or the like. The user's terminal 100 accesses communication system 300 which is suitably operative to transmit a calling signal to each of the called parties.

Communication system 300 is preferably operative to identify an incoming caller using conventional techniques, such as retrieving relevant information from memory if the caller is a subscriber of the same ISDN PBX system, for example, or alternatively, to use conventional ANI techniques to identify the caller. System 300 may also prompt the caller for other information.

System 300 operates to determine the availability of the second terminal to respond to the first signal using that portion of the first signal representing its urgency level (processing block 505). System 300 also preferably accesses and uses a data set from memory, the data set representing the availability of second terminal to respond to the first signal.

Referring to FIG. 4 for illustration, processing system 400n is operative to receive the calling signal from processing system 400a and if second terminal 100n is available (YES branch of decision block 510), processing system 400n is operative to establish a data link, or communication session, between terminals 100a and 100n(process block 515). In other words, the party using second terminal 100n is alerted with relevant information regarding the calling party.

In the event that second terminal 100n is unavailable, processing system 400n is operative to defer establishment of the data link, or communication session, until second terminal 100n becomes available. This is preferably accomplished as a function of at least the portion of the calling signal representing the urgency of the call (process block 520).

When deferring the call, second terminal 100, through processing system 400n, may suitably reduce the calling signal's urgency and/or increase the priority of its own current activity. If the user of first terminal 100a desires to leave a message for the user of second terminal 100n(YES branch of decision block 525), System 300 is operative to connect the user with a voice and/or data recording system, such as voice mail, e-mail, paging services or the like (process block 530).

If the calling signal does not include a data set or subset indicating whether the call must be returned by a specific deadline, system 300 preferably prompts the caller to indicate same. For example, the caller may have indicated the call was "significant" (priority level equals 6) but it may be "critical" (priority level equals 3) that the parties speak before 5 p.m. tomorrow. Such information may be received from the caller using an automated system with Dual-Tone Multi-Frequency ("DTMF") or speech recognition, for example. System 300 preferably uses the received deadline and estimated length information, and possibly other information, to schedule a convenient return communication session request.

System 300 is operative to monitor second terminal 100n to identify any change in availability to respond to the communication session request of first terminal 100a (decision block 535). For example, following a meeting, the user of second terminal 100n may return to his office and modify his priority level, lowering the same to reflect the importance of his current activity. Processing system 400n will begin the process of completing deferred calls having an urgency level greater than or equal to the current priority level setting.

Thus, when second terminal 100n becomes available (YES branch of decision block 535), processing system 300n is operative to transmit, as a function of the portion of the first signal and second terminal 100n's availability, a second signal from second terminal 100n to at least first terminal 100a(input/output block 540). At least a portion of the second signal represents the urgency associated therewith.

Thus processing system 400n will attempt to communicate with processing system 400a to establish a communication session between first and second terminals 100a and 100n, respectively. This activity is invisible to the users of either terminal until both are suitably available for the communication session. If first terminal 100a is available, the user of second terminal 100n is alerted. Preferably, the name of the user of first terminal 100a, the urgency associated with the call, the call's topic and estimated duration, an indication that the call was deferred, and/or the like is displayed.

In the event that first terminal 100a is unavailable, processing system 400a will defer establishment of the communication session. An important aspect of the invention is the substantial, if not complete, elimination of "telephone tag". System 300 is operative to automatically connect a plurality of terminals at a time that is mutually convenient.

In particular embodiments, upon becoming available, the user may be offered an option to review, and possibly reprioritize, deferred calls either by modifying their assigned urgency level and/or by directly overriding the order in which they are awaiting response, for example. In other embodiments, deferred calls may be responded to according to priority, associated deadlines, estimated call length, period of time that the call has remained deferred, and/or the like. In still further embodiments, if the user's schedule has been received from a suitably arranged scheduling apparatus, such as a PC, PDA or the like, running a time management program, the scheduling apparatus may anticipate the date, time and priority of the user's next activity and not return a particular deferred call having an estimated call length that is greater than the time remaining before the user's next activity.

Figure 6:
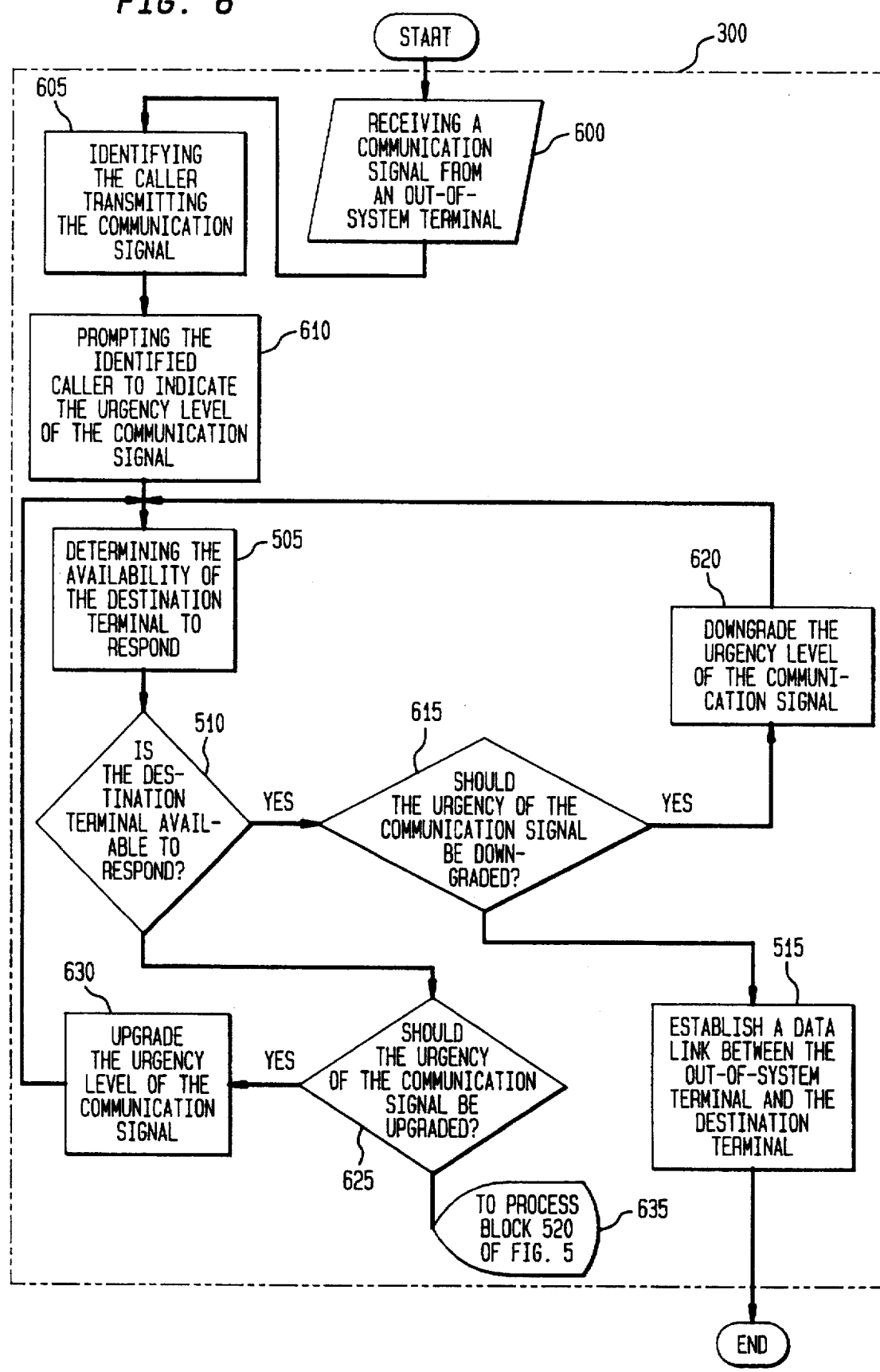
FIG. 6 illustrates another flow diagram for selectively scheduling communication sessions in accordance with the principles of the present invention.

FIG. 6 illustrates a flow diagram for processing communication signals received from a first time caller, or possibly a conventional terminal inoperative to support communication session scheduling in accordance with the present invention. Although implementation of the present invention is envisioned as servicing large work groups so that most communication would be between system subscribers, system 300 may suitably offer assistance when completing deferred calls to non-system subscribers. System 300 would still prioritize the calls. Further, the subscriber may select to have system 300 call with a synthesized voice and alert the subscriber when the other party picks up or leaves a message.

More particularly, a communication signal is received by communication system 300 from a first time caller or an out-of-system terminal (input/output block 600). For illustrative purposes, FIG. 6 refers to a call received from an out-of-system terminal. The caller transmitting the signal is identified as discussed previously (process block 605). The identified caller is prompted and asked to indicate the urgency level to be associated with the call (process block 610).

Communication system 300 operates to determine the availability of the destination terminal to respond to the same (process block 505). The determination is made using the indicated urgency level and, preferably, the current priority level of the destination terminal.

If the destination terminal is available, then a data file may be accessed to determine whether the urgency level of the communication signal should be downgraded (decision block 615). Communication system 300 may suitably be programmed to automatically decrease the priority level associated with a particular call, such as from a salesperson that has consistently mis-characterized the urgency of his calls (process block 620). If the communication signal is not downgraded then a data link is established between the first time call or out-of-system terminal and the destination terminal (process block 515).

In the event that the destination terminal is unavailable, another data file may be accessed to determine whether the urgency level of the communication signal should be upgraded (decision block 625). Communication system 300 may suitably be programmed to automatically increase the priority level associated with a particular call, such as from an important customer (process block 630). If the communication signal is not upgraded then establishment of a data link between the out-of-system terminal and the destination terminal is deferred, as discussed with reference to FIG. 5 (connector block 635).

Importantly, communication system services in accordance with the present invention may suitably be "personalized" for particular individuals. For example, individuals who are generally in their offices and do not require or wish to use pager and/or full personal communication system services may receive interruption management, messaging, and/or deferred call management services only.

Although the present invention has been described in detail, those skilled in the art should understand that they can make various changes, substitutions and alterations herein without departing from the spirit and scope of the invention in its broadest form.

What is claimed is:

1. A terminal for use in a communication system, said communication system capable of supporting communication session scheduling, said terminal comprising:

means for receiving and transmitting communication signals between a first party and a second party via said communication system;

an interface operative to receive an urgency portion of a scheduling signal initiated at the time a call is originated; and a circuit operative in response to said received urgency portion of a scheduling signal to modify selectively a first data set and a second data set, said first data set representative of the availability of said first party to respond to a received communication signal and said second data set representative of the urgency associated with a particular communication signal transmitted from said first party to said second party.

2. The terminal as set forth in claim 1 further comprising a memory operative to store one or more data sets including said first data set and said second data set.

3. The terminal as set forth in claim 1 wherein at least a portion of said particular communication signal is used to transmit said second data set from said first party to said second party.

4. The terminal as set forth in claim 1 further comprising a first apparatus including said interface and said circuit and a second apparatus including said receiving and transmitting means, said first apparatus and said second apparatus in operative communication with one another.

5. The terminal as set forth in claim 4 wherein said first apparatus is portable and is in operative wireless communication with said second apparatus.

6. The terminal as set forth in claim 1 wherein said receiving and transmitting means is operative to receive at least one of voice communication signals and data communication signals via said communication system.

7. The terminal as set forth in claim 1 further comprising means for indicating reception of a first communication signal.

8. The terminal as set forth in claim 1 wherein said received scheduling signal is received from one of said first party and a scheduling apparatus.

9. A method of operating a terminal of a communication system capable of supporting communication session scheduling, said terminal operative to receive and transmit communication signals between a first party and a second party via said communication system, said method comprising the steps of:

receiving an urgency portion of a scheduling signal initiated at call initialization through an interface of said terminal; and selectively modifying, in response to receiving said urgency portion of a scheduling signal, a first data set and a second data set, said first data set representative of the availability of a first party to respond to a received communication signal, and said second data set representative of the urgency associated with a particular communication signal transmitted from said first party to said second party.

10. The method as set forth in claim 9 further comprising the step of storing in a memory one or more data sets including said first data set and said second data set.

11. The method as set forth in claim 9 further comprising the step of using at least a portion of said particular communication signal to transmit said second data set from said first party to said second party.

12. The method as set forth in claim 9 further comprising the step of indicating that a first communication signal has been received.

13. The method as set forth in claim 12 wherein said first communication signal is at least one of a voice communication signal and a data communication signal.

14. The method as set forth in claim 9 further comprising the step of receiving said scheduling signal from one of said first party and a scheduling apparatus.

15. The method as set forth in claim 9 wherein a plurality of processing instructions are stored to a memory, and said method further comprises the steps of reading and executing one or more of said processing instructions to schedule one or more communication sessions.

16. A circuit for use in a terminal of a communication system capable of supporting communication session scheduling, said circuit comprising:

an input port operative to receive an urgency portion of a scheduling signal initiated at a calling station at initialization of a call, a memory operative to store a plurality of data sets; and circuitry operative in response to receiving said urgency portion of a scheduling signal to modify selectively at least one of a first data set and a second data set stored within said memory, said first data set representative of the availability of said terminal for use in responding to a received communication signal from said communication system, and said second data set representative of the urgency associated with a communication signal transmitted from said terminal over said communication system.

17. A system for selectively providing data links between ones of a plurality of terminals, each one of said terminals operative to transmit and receive one or more signals via said one or more selectively provided data links, said system comprising:

an input port operative to receive a first signal transmitted from a first terminal to a second terminal, a portion of said first signal created in conjunction with a call origination representing the urgency associated with said first signal:

a memory operative to store a data set representative of the availability of said second terminal to respond to said first signal; and circuitry operative to compare said data set and said portion of said first signal and, in response thereto, to one of:

provide a data link between said first terminal and said second terminal, and transmit, as a function of said data set and said portion of said first signal, a second signal from said second terminal to said first terminal, at least a portion of said second signal representing the urgency associated with said second signal.

18. The system as set forth in claim 17 wherein said circuitry is further operative to defer transmitting said second signal until said second terminal is available.

19. The system as set forth in claim 18 wherein transmission of said second signal is deferred as a function of said data set and said portion of said first signal.

20. The system as set forth in claim 18 wherein said circuitry is further operative to adjust at least one of said data set and said portion of said first signal.

21. The system as set forth in claim 18 wherein said circuitry is operative to store a message signal transmitted from said first terminal.

22. The system as set forth in claim 17 wherein said circuitry includes a plurality of processing systems.

23. The system as set forth in claim 22 wherein ones of said processing systems are associated with ones of said plurality of terminals.

24. The system as set forth in claim 17 further comprising a Public Switched Telephone Network (PSTN) switching office.

25. A method for selectively scheduling communication sessions between ones of a plurality of terminals of a communication system, each one of said terminals operative to transmit and receive one or more signals via said communication system, said method comprising the steps of:

transmitting a first signal at call origination from a first terminal to a second terminal, a portion of said first signal created at call origination and representing the urgency of a communication session between said first terminal and said second terminal;

determining the availability of said second terminal to respond to said first signal using at least said portion of said first signal; and establishing said communication session upon a determination that said second terminal is available, otherwise deferring, as a function of said portion of said first signal, establishment of said communication session until said second terminal is available.

26. The method as set forth in claim 25 wherein said determining step further includes the step of comparing said portion of said first signal and a data set representative of the availability of said second terminal to respond to said first signal.

27. The method as set forth in claim 26 wherein said deferring step further includes the step of transmitting, as a function of said data set and said portion of said first signal, a second signal from said second terminal to at least said first terminal, at least a portion of said second signal representing the urgency associated with said second signal.

28. The method as set forth in claim 27 wherein transmission of said second signal is deferred as a function of said data set and said portion of said first signal.

29. The method as set forth in claim 26 further including the step of adjusting at least one of said data set and said portion of said first signal.

30. The method as set forth in claim 25 further including the step of storing a message signal transmitted from said first terminal.

* * * * *